Dec. 29, 1970  H. P. HALLING  3,551,010
PIPE OR DUCT JOINTS

Filed Jan. 7, 1969  3 Sheets-Sheet 1

Inventor
Horace Percival Halling
By
Attorney

Dec. 29, 1970   H. P. HALLING   3,551,010
PIPE OR DUCT JOINTS
Filed Jan. 7, 1969   3 Sheets-Sheet 2

Inventor
Horace Percival Halling
By
Dowell Dowell
Attorneys

Dec. 29, 1970          H. P. HALLING            3,551,010
                      PIPE OR DUCT JOINTS
Filed Jan. 7, 1969                          3 Sheets-Sheet 3

United States Patent Office 3,551,010
Patented Dec. 29, 1970

3,551,010
PIPE OR DUCT JOINTS
Horace Percival Halling, Leverstock Green, England, assignor to Avica Equipment Limited, London, England, a British company
Filed Jan. 7, 1969, Ser. No. 789,572
Claims priority, application Great Britain, Jan. 11, 1968, 1,683/68
Int. Cl. F16l 27/00
U.S. Cl. 285—226                                7 Claims

ABSTRACT OF THE DISCLOSURE

A pipe coupling of the type having end-pieces which are joined by a gimbal joint and sealed by a flexible bellows, wherein the gimbal joint is a four armed cross-piece spider each arm of which is joined to a respective lug of an end-piece by a trunnion or pivot pin.

---

This invention relates to flexible pipe or tube couplings and is particularly concerned with couplings of the type comprising two tubular end pieces one for connection respectively to each of the tubes to be joined, the two end pieces being interconnected by a gimbal joint to allow universal movement and by a flexible tubular sheath surrounding the gimbal joint and joined to each of the end pieces to prevent escape of fluid from the tubes at the joint, the flexible sheath preferably but not essentially, being formed by a metallic bellows. Such a flexible coupling will hereafter be referred to as a flexible coupling of the type described.

A flexible pipe coupling of the type described in accordance with this invention has its gimbal joint formed by a four armed cross piece or spider positioned within a pair of diametrically opposed axially extending curved lugs at the end of one end piece and within a similar pair of lugs which extend axially from the other end piece and which are located between the lugs of the first end piece a clearance being present between the lugs, the end faces of each arm of the cross piece being connected by a pivot pin to one of the lugs respectively.

The use of such a cross piece or spider greatly reduces the outside diameter of the joint as compared with prior proposals in which either the end pieces are specially curved and overlie a gimbal ring or in which the gimbal ring is located over the end pieces. As the end load on a joint in use varies as the square of the diameter, the reduction in diameter also greatly reduces the end load. Further a joint in accordance with this invention can transmit a greater load as the cross piece is subject only to bending forces whereas a comparable gimbal ring is subject both to bending and torsion forces.

A reinforcement plate may be provided extending at each lug of the end pieces so as to add strength at those points where the trunnion pins are connected to the lugs.

The clearance between the lugs may be such as to allow a 6° movement of one end piece relatively to the other in any direction.

Embodiments of pipe joints in accordance with the invention will now be described by way of example with reference to the accompanying drawings in which.

Figure 1:
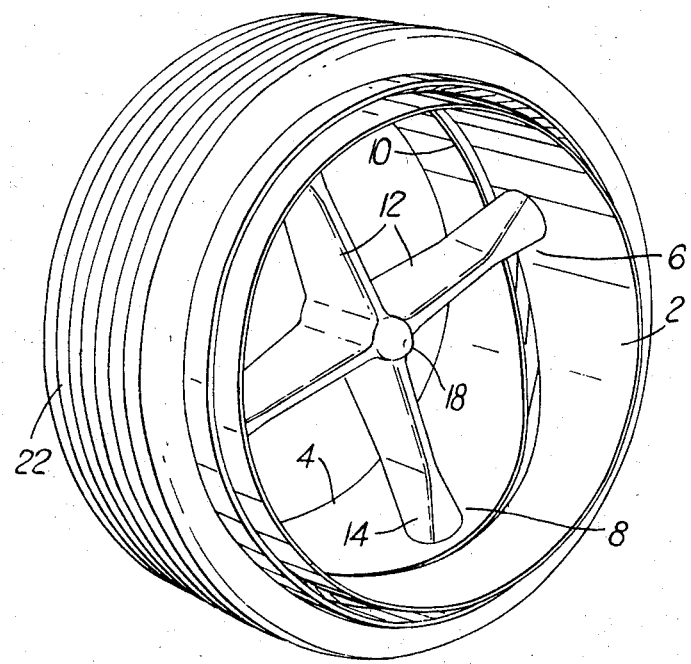
FIG. 1 is a perspective view of one embodiment of the joint.

The pipe joint shown in the drawings comprises two end pieces 2, 4 designed for connection to each of the pipes to be joined. Each end piece is formed with two identical diametrically opposed curved lugs, extending axially out from adjacent ends, the lugs 6 of the end piece 2 being located between the two lugs 8 of the end piece 4, a clearance indicated at 10 being left between the end pieces to allow relative movement.

A four armed cross piece or spider 12 is positioned within the lugs 6, 8 and has a part of the end face of each of its arms enlarged as indicated at 14 to receive a trunnion pin 16 to connect the arms to each of the lugs 6, 8 and to thus provide a gimbal joint allowing universal relative movement of the end pieces for an extent governed by the shape of the lugs and the width of the gap 10 for example 6°.

The hub 18 and edges of the arms of the cross piece are rounded as can well be seen from FIG. 1. This not only has the effect of minimising turbulence in fluid flowing past the cross piece but may even smooth out turbulence already present in the fluid flow.

Figure 2:
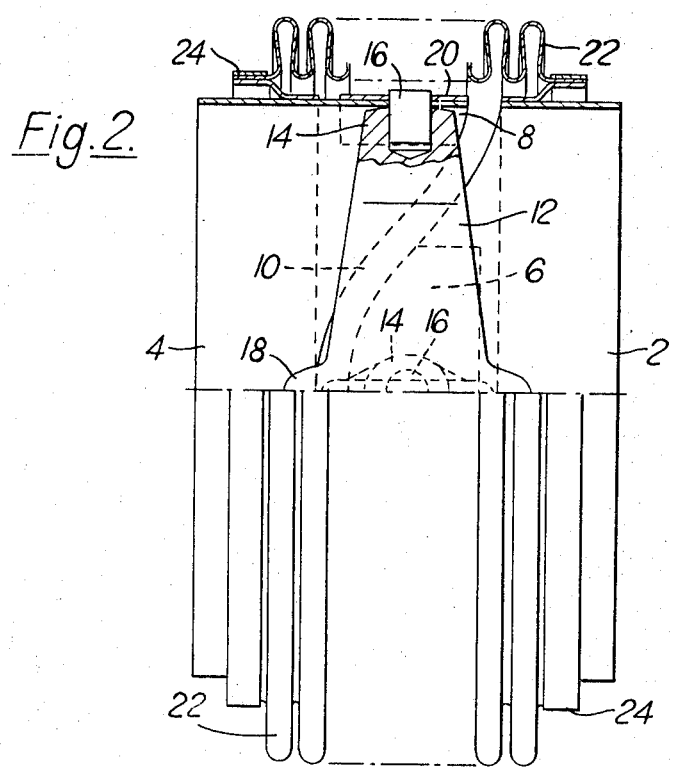
FIG. 2 is a part sectional elevation of the joint of FIG. 1.
Figure 3:
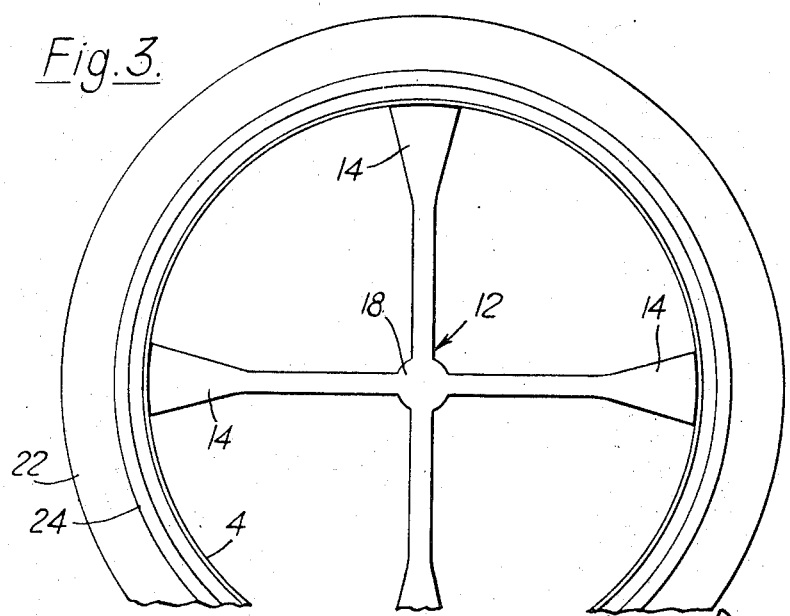
FIG. 3 is an end view.

The end pieces are reinforced at the point of connection of the trunnion pins 16 by means of reinforcing plates 20 (see FIG. 2) which surrounds the lugs and aids in providing a sound anchorage for the pins.

The connection between the end pieces is rendered fluid tight by a flexible metal tubular bellows 22 which is welded to bellows attachment rings 24 each of which rings is welded to the surface of one of the end pieces respectively.

Figure 4:
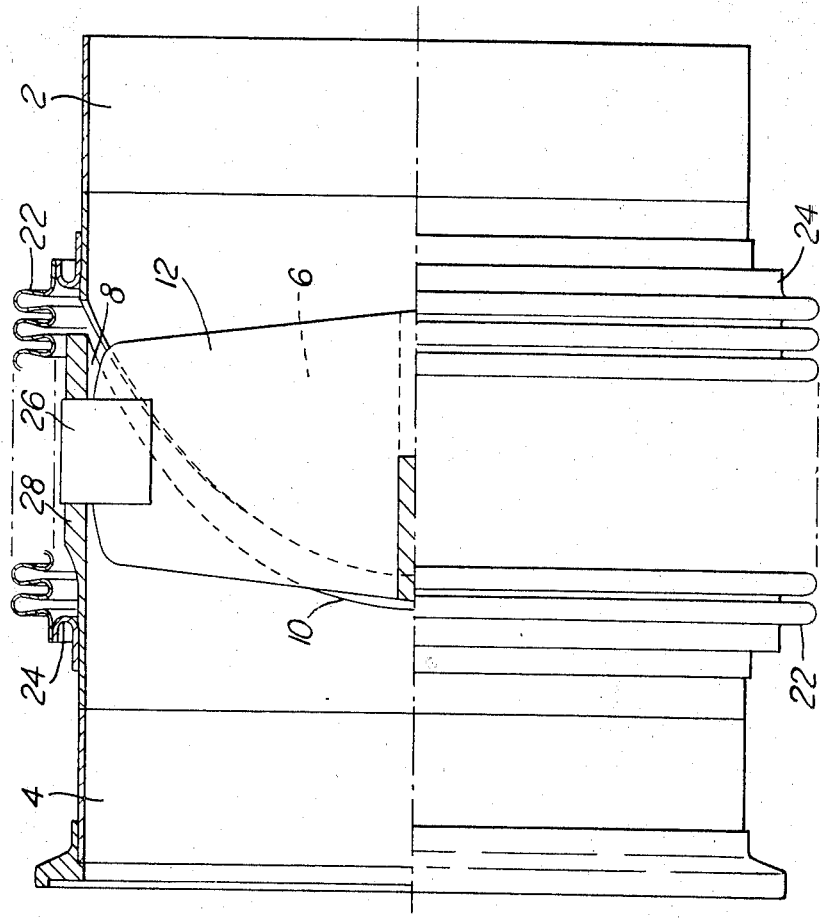
FIG. 4 is a part sectional elevation of a modified joint.

The joint illustrated in FIG. 4 is modified by forming the trunnion pins as an integral part 26 of the spider 12. In the case and in order to enable the joint to be assembled the end pieces 2 and 4 are made in two halves, split longitudinally and then welded together after assembly on the spider.

Further the reinforced plates 20 are replaced by a local thickening, indicated at 28, of the end pieces 2 and 4.

I claim:

1. A pipe coupling for joining together two pipes, the coupling being of the type comprising, a first tubular end piece, and a second tubular end piece, each for connection respectively to one of the two pipes to be joined; a pair of diametrically opposed axially extending curved lugs extending from the end of the first end piece; a similar pair of lugs extending axially from the end of the second end piece and being located between and spaced apart from the lugs of the first end piece; a gimbal joint connecting the two end pieces so as to allow universal movement; and a flexible tubular sheath surrounding the gimbal joint and joined to each of the end pieces to prevent escape of fluid from the pipes or tubes at the joint; said gimbal joint comprising a spider having a hub and having four arms, the spider being located between the lugs of the two end pieces, and pivot pins connecting the end face of each of the said four arms of the spider to their respective lugs.

2. A pipe coupling as claimed in claim 1 wherein a part at least of the end face of each of the said four arms of the spider is enlarged to receive the pivot pin.

3. A pipe coupling as claimed in claim 1 wherein the pivot pins are secured integrally to the end portion of each of the said four arms of the spider.

4. A pipe coupling as claimed in claim 1 having a reinforcement plate secured to each lug at the point of connection of the pivot pin.

5. A pipe coupling as claimed in claim 1 in which the end pieces are thickened locally at the points of connection of the pivot pins.

6. A pipe coupling as claimed in claim 1 wherein the hub and edges of the arms of the spider are rounded at least on one side to help provide for smooth fluid flow.

7. A pipe coupling as claimed in claim 1 wherein the flexible sheath comprises a metal tubular bellows.

(References on following page)

References Cited

UNITED STATES PATENTS

| | | | |
|---|---|---|---|
| 2,936,185 | 5/1960 | Olsen et al. | 285—265X |
| 3,070,387 | 12/1962 | Peyton | 285—227X |
| 3,112,129 | 11/1963 | Willis et al. | 285—226 |
| 3,232,076 | 2/1966 | Sundt | 285—226X |
| 3,251,614 | 5/1966 | Woodson | 285—114 |

FOREIGN PATENTS

| | | | |
|---|---|---|---|
| 1,501,952 | 10/1967 | France | 285—114 |
| 816,157 | 7/1959 | Great Britain | 285—226 |

THOMAS F. CALLAGHAN, Primary Examiner

U.S. Cl. X.R.

285—265